US009042359B1

(12) United States Patent
Thommana et al.

(10) Patent No.: US 9,042,359 B1
(45) Date of Patent: May 26, 2015

(54) COGNITIVE SPECTRUM VIOLATION DETECTION

(75) Inventors: John Thommana, Cedar Rapids, IA (US); Lizy Paul, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1310 days.

(21) Appl. No.: 11/903,627

(22) Filed: Sep. 24, 2007

(51) Int. Cl.
*H04L 29/06* (2006.01)

(52) U.S. Cl.
CPC ........ *H04L 63/1416* (2013.01); *H04L 63/1425* (2013.01)

(58) Field of Classification Search
CPC ..... H04W 84/12; H04W 80/04; H04W 88/06; H04W 8/26; H04W 12/12; H04W 84/18; H04L 43/0817; H04L 45/02; H04L 45/24; H04L 63/0263; H04L 63/1408; H04L 63/1416; H04L 63/1441; H04L 63/1425; H04L 63/1491; H04L 41/0681
USPC ......... 455/515, 434, 435.1, 456.1; 370/310.1, 370/338
See application file for complete search history.

(56) References Cited

U.S. PATENT DOCUMENTS

| | | | |
|---|---|---|---|
| 5,459,761 A | 10/1995 | Monica et al. | |
| 5,845,211 A | 12/1998 | Roach, Jr. | |
| 5,953,319 A | 9/1999 | Dutta et al. | |
| 6,151,309 A | 11/2000 | Busuioc et al. | |
| 6,163,701 A | 12/2000 | Salch et al. | |
| 6,415,151 B1 | 7/2002 | Kreppel | |
| 6,459,881 B1 | 10/2002 | Hoder et al. | |
| 6,639,898 B1 | 10/2003 | Dutta et al. | |
| 6,771,957 B2 | 8/2004 | Chitrapu | |
| 6,876,864 B1 | 4/2005 | Chapin | |
| 7,043,245 B2 | 5/2006 | Dokko | |
| 7,076,246 B2 | 7/2006 | Chitrapu | |
| 7,126,913 B1 | 10/2006 | Patel et al. | |
| 7,154,938 B2 | 12/2006 | Cumeralto et al. | |
| 7,177,377 B2 | 2/2007 | Wu et al. | |
| 7,184,777 B2 | 2/2007 | Diener et al. | |
| 7,212,789 B2 | 5/2007 | Kuffner | |
| 7,218,937 B2 | 5/2007 | Peltola et al. | |
| 7,366,148 B2 * | 4/2008 | Muaddi et al. | 370/338 |
| 7,742,425 B2 * | 6/2010 | El-Damhougy | 370/241 |
| 2003/0181213 A1 * | 9/2003 | Sugar et al. | 455/454 |
| 2004/0028016 A1 * | 2/2004 | Billhartz | 370/338 |
| 2004/0098610 A1 * | 5/2004 | Hrastar | 713/200 |
| 2004/0246929 A1 * | 12/2004 | Beasley et al. | 370/335 |
| 2007/0268880 A1 * | 11/2007 | Bellur et al. | 370/338 |
| 2008/0244707 A1 * | 10/2008 | Bowser et al. | 726/4 |
| 2009/0049546 A1 * | 2/2009 | Verma | 726/22 |

* cited by examiner

*Primary Examiner* — George Eng
*Assistant Examiner* — Hung Du
(74) *Attorney, Agent, or Firm* — Angel N. Gerdzhikov; Donna P. Suchy; Daniel M. Barbieri

(57) ABSTRACT

A radio node in a radio network includes signal processing hardware. The radio node includes radio frequency (RF) transceiver hardware. The radio node also includes a spectrum sensor configured to detect potential spectrum policy violations. Further, the radio node includes a non-cooperation discriminator used to determine the non-cooperative character of a monitored radio node.

13 Claims, 4 Drawing Sheets

COGNITIVE SPECTRUM VIOLATION DETECTION

BACKGROUND

Conventional military networks are mobile ad hoc wireless networks. In these networks every node acts as a router and can route traffic to other nodes. Such networks pose stringent requirements for security and reliability. They are highly dynamic in nature because mobile ad hoc networks are formed over wireless links. Links are susceptible to failures because of the mobility of nodes, or loss of connectivity due to the volatility of wireless links. Strict requirements on security and reliability combined with the dynamic nature of the network provide a strong motivation for self-forming, self-configuring, and self-healing capabilities in the network.

Because of the mobility, power constraints, and bandwidth requirements, wireless communication nodes have made the task of ad-hoc network management very difficult. Current research is focused on auto-network management and policy based network management. One major disadvantage of both auto-network management and policy based network management is that every node can have only a limited view of the network and has to work within the limitations of its view. For example, FIG. 1 depicts a nodal communication network 100 in which each node 110 can talk to or can have information about its neighboring node(s), depicted by the connection lines between the nodes 110. Because of the deficiencies of mobile ad-hoc networks, the problem of policing spectrum usage is a difficult one. Although solutions have been developed, each have their own deficiencies. Accordingly, there is a need for improved methods and systems for policing radio spectrum usage and enforcing policies.

The techniques herein below extend to those embodiments which fall within the scope of the appended claims, regardless of whether they accomplish one or more of the above-mentioned needs.

SUMMARY

In one aspect a radio node in a radio network includes signal processing hardware. The radio node includes radio frequency (RF) transceiver hardware. The radio node also includes a spectrum sensor configured to detect potential policy violations. Further, the radio node includes a non-cooperation discriminator used to determine the non-cooperative character of a monitored radio node.

In another aspect, a radio node in a radio network includes signal processing hardware. The radio node also includes radio frequency (RF) transceiver hardware. Further the radio node includes a non-cooperation discrimination protocol that makes decisions on discriminating of other radio nodes in the network.

In yet another aspect a radio network includes a plurality of radio nodes. The radio network also includes a plurality of reconfigurable connections between the radio notes. At least some of the radio nodes are configured with a combination of hardware and software to carry out cognitive non-cooperation in order to detect spectrum policy violations.

Alternative exemplary embodiments relate to other features and combinations of features as may be generally recited in the claims.

BRIEF DESCRIPTION OF THE DRAWINGS

A better understanding of the features and advantages of the invention will be obtained by reference to the following detailed description that sets forth illustrative embodiments by way of example only, in which the principles of the invention are utilized, and the accompanying drawings, of which.

DETAILED DESCRIPTION

Figure 1:
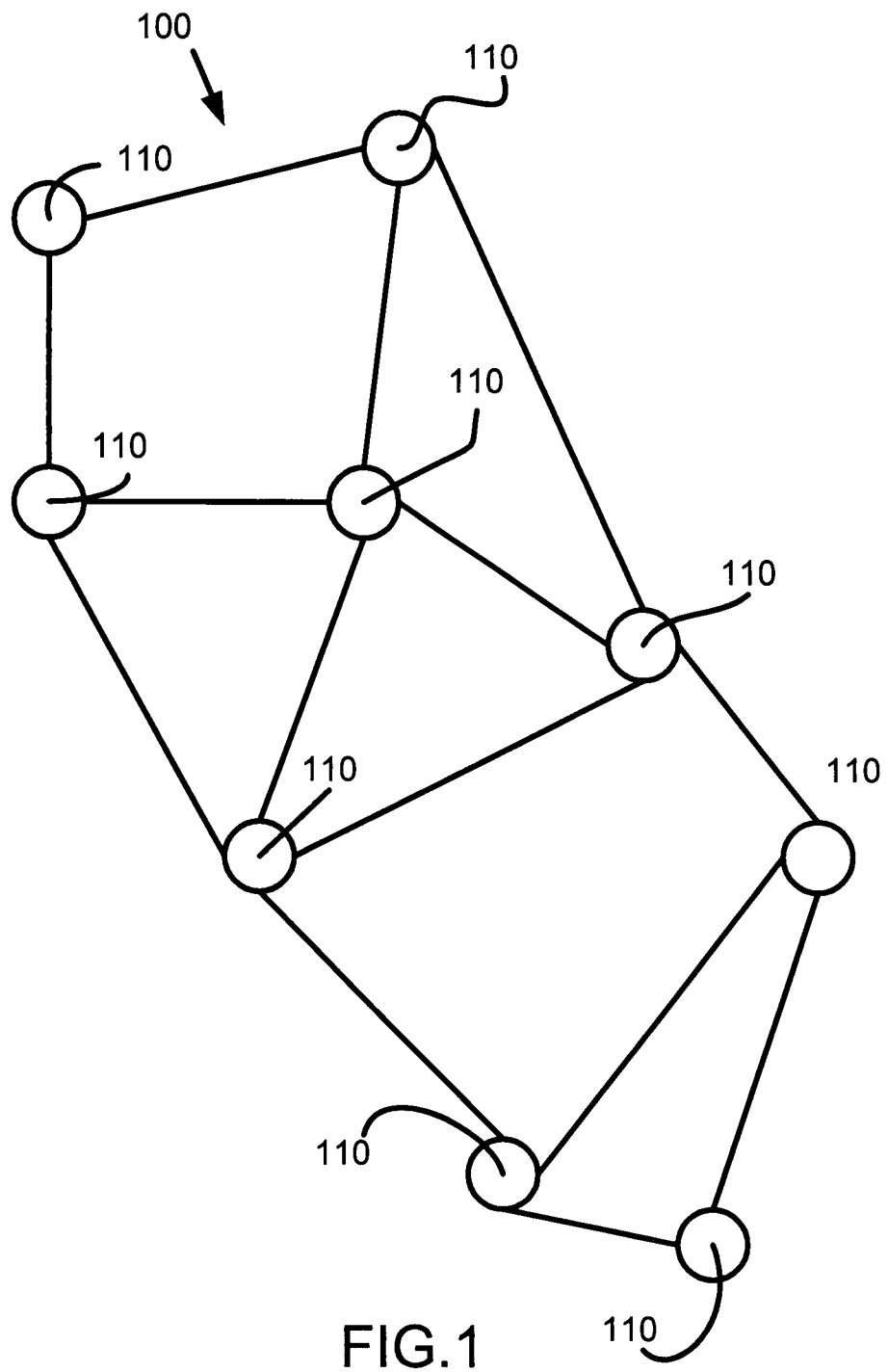
FIG. 1 is an exemplary diagram of a network of radio nodes.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Policy Compliant Radio is a term used to describe one of the goals of the neXt Generation communications (XG) program. The core component of a Policy Compliant Radio is a smart frequency agile cognitive radio that can sense the radio spectrum over a wide frequency band, determine free spectral bands, and opportunistically use the free spectral bands without creating interference for the primary spectrum owner and co-existing peacefully with other opportunistic users operating in the selected band.

The key factor that will influence the sale of cognitive radios is its ability to maximize its communication resources in the presence of other cognitive radios. Just like humans, there will exist cognitive radios that intentionally or unintentionally violate operating rules or operate at the fringes of legality to maximize its performance.

For example a CSMA/CA radio will scan the band for 9 µs instead of 10 µs and will gain access to the medium more often than other law abiding radios that wait for 10 µs. Even if the vendor is caught and forced to correct his errors in future radios, once the radios are fielded there is very little that can be done to eradicate all radios operating unfairly. This can be due to multiple reasons like the owner not being savvy enough to update the radio with the latest software/hardware to the owner choosing not to upgrade knowing the benefits.

Various methodologies have been developed to enforce policies including the use of an on-board policy enforcer. In this methodology, every cognitive radio has a certified trusted tamper-proof policy enforcer. However one difficulty among others is that much current work in cognitive radios is being done in the open source domain, such as GNU Radio. Accordingly, an ill-intentioned group may easily create non-policy conformant versions of cognitive radios.

In another methodology, the communication space is interspersed with dedicated spectrum police whose aim is to detect policy violators and report them. An embodiment of this methodology is to equip cognitive radios with "Shutdown or Kill" switches. The spectrum police can then issue temporary or permanent shutdown commands. The incorporation of those shutdown switches provide malicious radios an opportunity to cause confusion and chaos by shutting down nodes. There is no way to prevent malicious nodes from issuing the shutdown command. Another methodology is the jamming of policy violators. This, though feasible, impacts not only the malicious user but also hurts other policy abiding radios operating in the vicinity by reducing their capacity and opportunities for communication.

Figure 2:
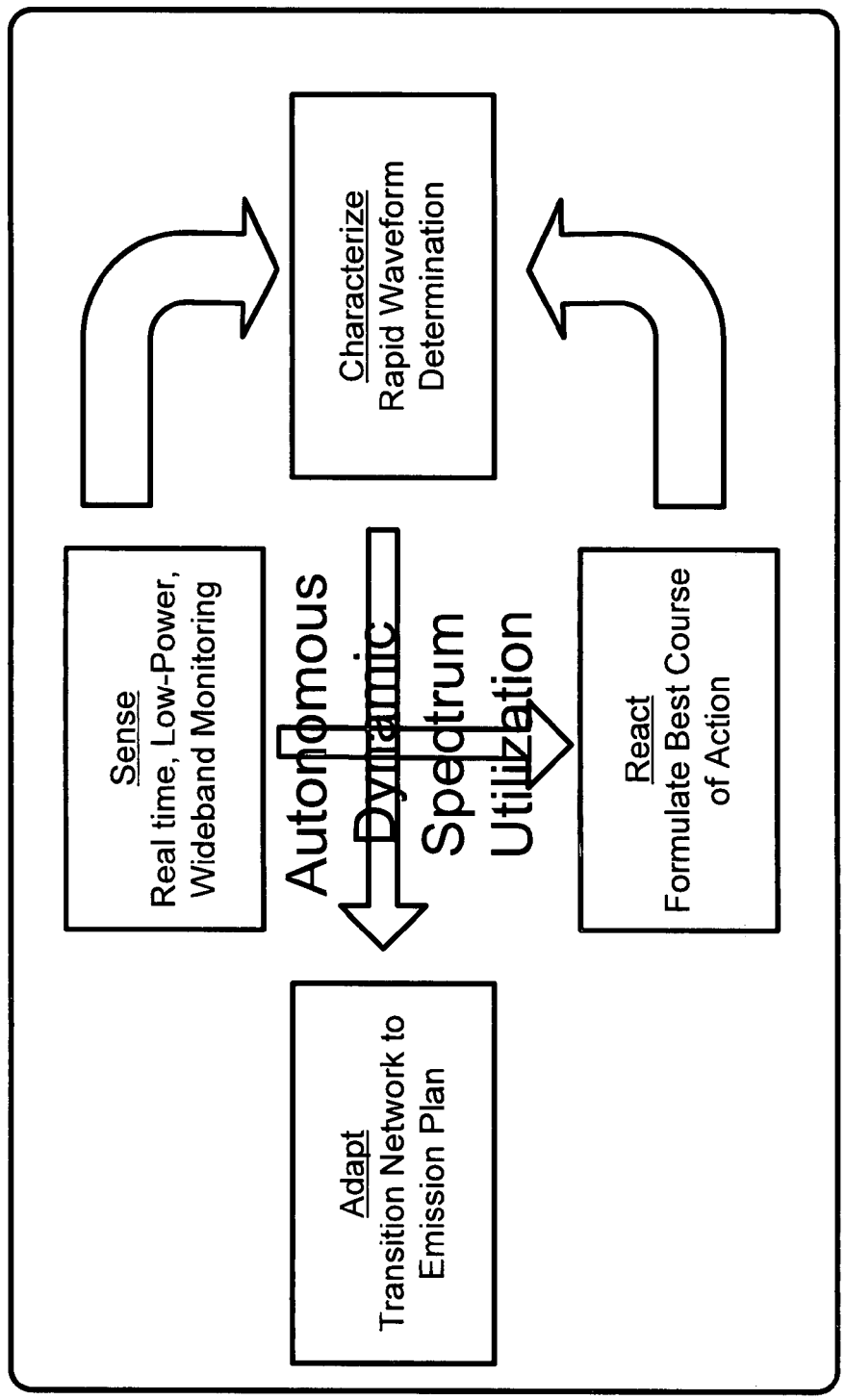
FIG. 2 is an exemplary flow diagram of spectrum utilization.

FIG. 2 illustrates an exemplary operation methodology of an XG sensor. The DARPA vision of next generation communication devices is a standardized policy aware cognitive radio. Every communication provider in the world will disseminate access and usage policies that adaptive cognitive radios can decipher to use the communication spectrum co-operatively. Multiple standardized spectrum sharing approaches are being formulated.

The XG sensors will be adaptively using the available spectrum in a cooperative fashion taking utmost care to ensure that the original spectrum owner is not adversely affected.

What choice do policy abiding cognitive radios have in the presence of non-policy abiding cognitive radios? Cognitive non-cooperation is the only option available.

Cognitive non-cooperation is a human social behavior where an individual on detecting an unjust social behavior decides to do something about it and organizes a group of other like minded individuals to educate the community of the behavior, come up with means of detecting the offending behavior and acting in a manner to prevent the propagation of the behavior.

Cognitive non-cooperation is one example of social behavior invading the technological space.

The frequency agile spectrum sensor (XG Sensor) in the cognitive radio is used to detect potential spectrum policy violations. The potential violations may be verified cognitively against normalized behavior patterns to detect true violators. RF fingerprinting and/or other techniques (such as denial of service patterns, etc. may be used to identify a radio. Multiple violations from the same radio may be used to increase confidence in a decision. Once a verification threshold has passed a radio may be added to a "Non-Cooperation List." Packets from and to all violators in the "Non-Cooperation List" may be dropped and not forwarded thereby islanding violators. Violator reduction via battery depletion is a possible outcome.

Another characteristic of cognitive non-cooperation is to report violators and/or RF fingerprint of violators to neighboring nodes. Neighbors will program their XG sensor to detect violations and verify violation status. The neighbors can behave cognitively to violators based on its relationship (trust) of the reporter and/or rely on its own monitoring of the spectrum. There is a chance that the violator will overhear or anticipate this move and change its RF signature or other characteristics like "MAC Address" that are used in identity confirmation.

Therefore, it may be desirable to have multiple radios that can band together to track potential violators and identify chameleons that change or vary their identifiers to prevent detection. Signal level variation patterns, Doppler variation patterns, location and proximity patterns etc. may all be used to unmask violators and jammers. Further, detection and tracking strategies can be exchanged between trusted nodes to make collaborative cooperation a reality. Also, strategies can be associated with trust levels, such that a node may only exchange strategies that are of lesser or equal trust level that they have with a peer.

Current XG Sensors can scan and characterize nearly 3 GHz of spectrum in a second. This fast rate of scanning is not useful for agile spectrum adaptation (the primary goal of XG sensor) as the amount of processing and information to be exchanged for selecting a suitable frequency band is directly proportional to the rate of scanning. In fact most spectral scanners average the results of multiple spectral scans to identify spectral vacancies.

Fast spectrum scanners are very useful for detecting spectrum violators and jammers. One way to differentiate between jammers and accidental or non-compliant radios is to measure the time interval between the first communicator and the interfering second communicator and/or packet send and receive ratios.

Accidental jamming due to policy violation and or non-compliant radios is easily detectable by the varying position of the interfering bursts. Cognitive techniques can be used to determine packet arrival rates to avoid and/or minimize the impact.

Non-Cooperation, as per Mahatma Gandhi, means refusal both to help the sinner (Policy Violating Radio) in his sin and to accept any help or gift (Relaying and Forwarding) from him till he has repented. Non-Cooperation is intended to pave the way to real, honorable and voluntary cooperation based on mutual respect and trust. Nonviolence (no jamming of the violator or sending out kill signals etc) is the rock on which the whole structure of Non-Cooperation is built.

In accordance with exemplary embodiments, Neural Network, Genetic Algorithm, Game Theory based Cognitive Radios may realize, through inference and interaction, that co-operative and fair use of shared property (spectrum, power management etc.) is the only solution and may observe it without coercion.

In accordance with exemplary embodiments, cognitive non-cooperation may be applied to numerous devices, including but not limited to Software Defined Radios, Cognitive Radios.

Figure 3:
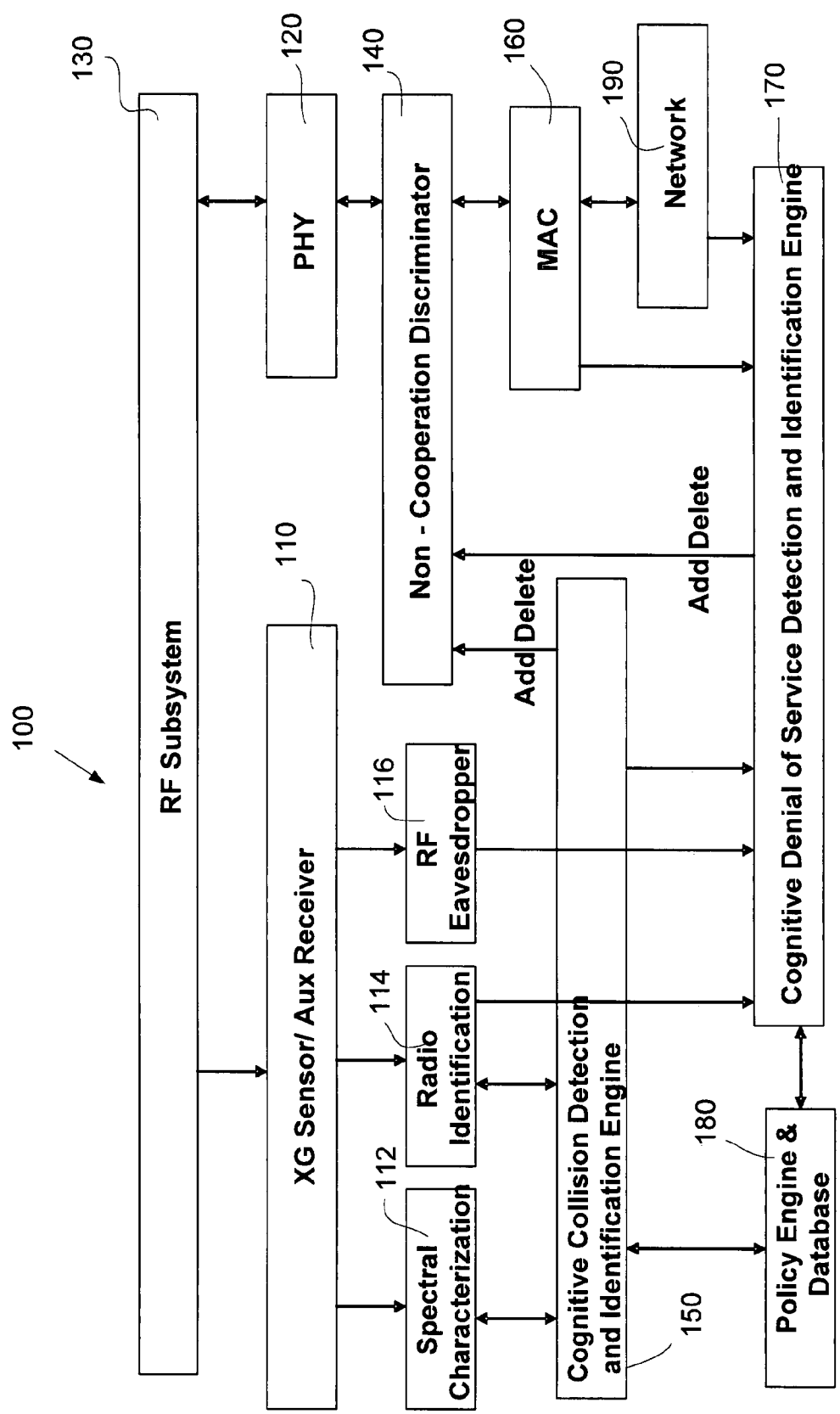
FIG. 3 is an exemplary block diagram of a cognitive engine.

Referring now to FIG. 3, a block diagram of an exemplary embodiment of a cognitive radio is depicted. Cognitive radio 100 includes an XG sensor/auxiliary receiver 110, and a PHY (physical layer device) 120 coupled to an RF subsystem 130. XG sensor/auxiliary receiver 110 may send information to a spectral characterization subsystem 112, a radio identification subsystem 114, and an RF eavesdropper subsystem 116. Spectral characterization subsystem 112 and radio identification subsystem 114 exchange information with a cognitive collision detection and identification engine 150 which among other tasks has the ability to add and delete nonviolators or violators. Such information may be provided to a non-discriminator subsystem 140 which also exchanges information with PHY 120, a MAC layer 160 and receives other add/delete information from a cognitive denial of service detection and identification engine 170. A policy engine and database 180 exchanges information, such as but not limited to the policy set, with both cognitive collision detection and identification engine 150 and cognitive denial of service detection and identification engine. MAC layer 160 exchanges information with a network 190 and network 190 also provides information to cognitive denial of service detection and identification engine 170. The above described structure may vary depending on design objectives and constraints. Accordingly, the above structure is but one example of the structure of such a cognitive radio system.

The radio identification subsystem is a key component of the radio. In addition to using it as a means of identifying a radio it is used for fast response. The key questions that this subsystem asks are 1. Have I seen this radio before? Is this radio from a family of radios, e.g. a specific model that misbehaves? Do I have a strategy to deal with it? Will the last strategy I used in dealing with this radio work under the present condition?

Figure 4:
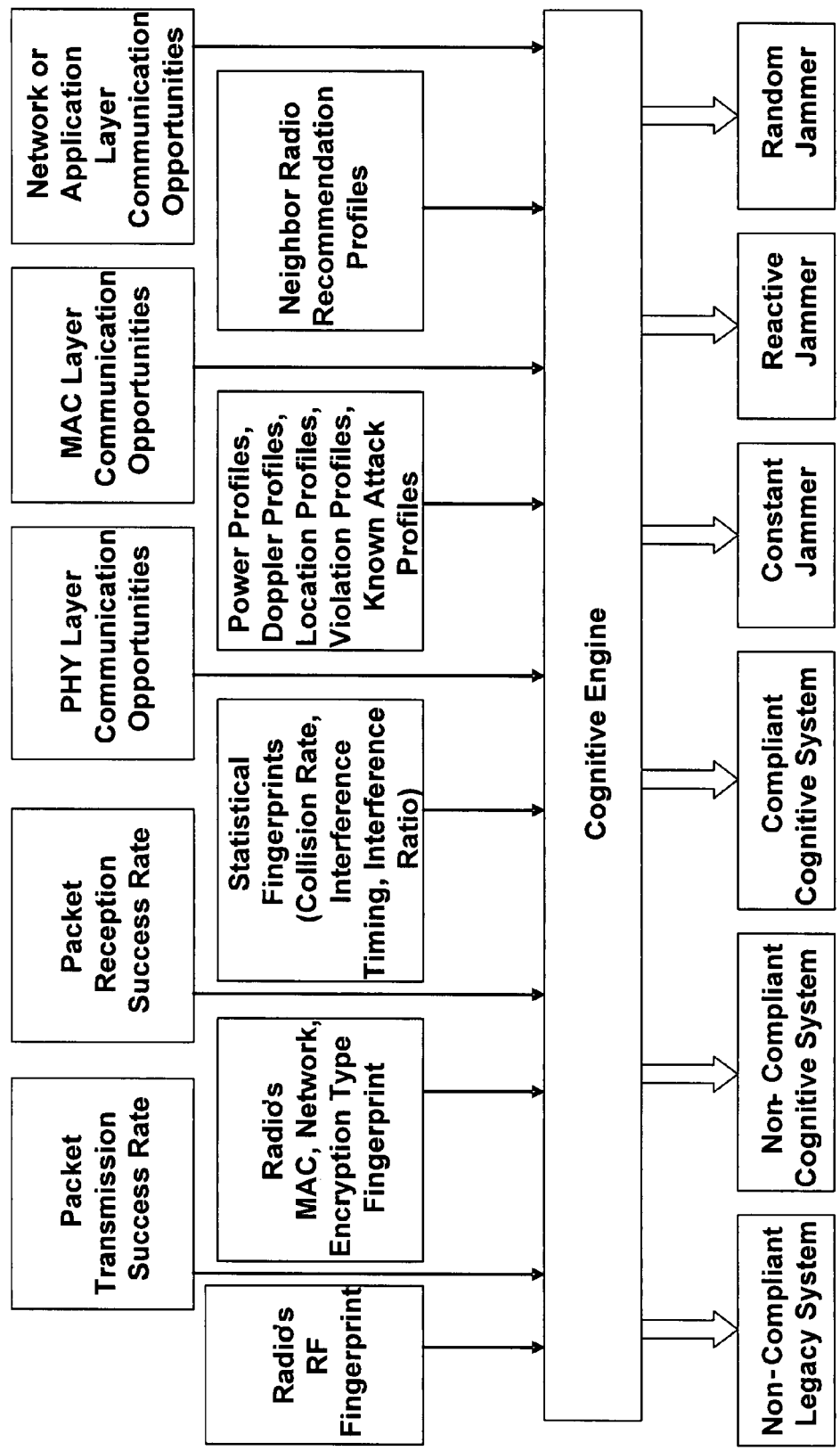
FIG. 4 is an exemplary diagram of a cognitive engine.

Referring now to FIG. 4, a cognitive engine is depicted in accordance with an exemplary embodiment. The cognitive engine is depicted having multiple inputs having to do with the performance of the radio and the performance detected on the network. The cognitive engine is also depicted having a variety of output information categorizing the type of node being detected as communicating on the network. Although specific inputs and outputs are depicted, the type and variety of inputs and outputs is not so limited. More or fewer inputs and/or outputs may be used without departing from the scope of the invention. Some of the exemplary functions associated with blocks of FIG. 4 are provided below.

Referring to FIG. 4, an exemplary implementation of the Radio's RF Fingerprint block includes the following functions among others—If the RF emissions of every radio are analyzed—they are unique in some way due to differences in component manufacture and varying performance within the tolerance permitted. Based on the emissions characteristics of a radio it is possible to identify if the radio node has been encountered in the past. The database will keep track of every radio's past behavior and negotiation strategies that worked and failed.

To successfully detect chameleon radios it is necessary to track radio characteristics at multiple levels. The RF fingerprints are then tracked with MAC addresses used, IP addresses used, protocols used and waveforms used to create a modus operandi.

Statistical fingerprints are also maintained (see FIG. 4)—this allows for prediction of the type of interferer based on interference timing (how soon after a burst can this radio react and jam us), collision rate (does the radio node jam every burst or does he selectively or randomly jam bursts), what is the expected statistical throughput possible based on this behavioral pattern.

Radio profiles are also maintained that track the radios based on received power level, variation in received power level, Doppler variation, directional movement, local positioning wrt to one or more radio nodes etc (see FIG. 4). These profiles can be used by individual radios to identify radios that change dynamically to avoid detection. These profiles can be exchanged between other trusted nodes to track the movement of rouge radios and warn network nodes of potential problems.

While the detailed drawings, specific examples, and particular formulations given described exemplary embodiments, they serve the purpose of illustration only. It should be understood that various alternatives to the embodiments of the invention described maybe employed in practicing the invention. It is intended that the following claims define the scope of the invention and that structures within the scope of these claims and their equivalents be covered thereby. The hardware and software configurations shown and described may differ depending on the chosen performance characteristics and physical characteristics of the computing and analysis devices. For example, the type of computing device, communications bus, or processor used may differ. The systems shown and described are not limited to the precise details and conditions disclosed. Method steps provided may not be limited to the order in which they are listed but may be ordered any way as to carry out the inventive process without departing from the scope of the invention. Furthermore, other substitutions, modifications, changes and omissions may be made in the design, operating conditions and arrangements of the exemplary embodiments without departing from the scope of the invention as expressed in the appended claims.

What is claimed is:

1. A radio node in a radio network, comprising:
signal processing hardware;
radio frequency (RF) transceiver hardware;
a spectrum sensor configured to detect at least one of a potential spectrum policy violation, an accidental violation, a malicious violation, and a jamming;
a cognitive collision detection and identification engine coupled to the spectrum sensor, the cognitive collision detection and identification engine configured to create a radio profile of radios, the radio profile including an RF fingerprint, received power level, trust level, associated behavior, associated strategy, Doppler variation, variation in received power level, directional movement and local positioning with respect to a particular radio node and store the radio profile in a database, the radio profile is correlated with media access control (MAC) addresses used, internet protocol (IP) addresses used, interference timing and collision rate to determine if a particular radio profile is at least one of a malicious violator, a non-malicious violator, a nonviolator, and trusted;
a cognitive denial of service detection and identification engine coupled to the spectrum sensor; and
a non-cooperation discriminator configured to:
exchange information with at least one of a physical layer device (PHY) layer and a MAC layer of the radio node;
adjust at least one of a first trust level of a radio profile associated with a first radio node and at least one second trust level of a radio profile associated with a second radio node in response to information received from at least one of the cognitive collision detection and identification engine, a cognitive denial of service detection and identification engine, and a sending radio node; and
when the first trust level reaches a trust threshold or the first radio node is determined to be a malicious violator, execute a countermeasure other than jamming or attacking the first radio node, the countermeasure including at least one of (1) report to the at least one second radio node at least one of the first trust level and a strategy having a third level no higher than the second trust level, and (2) block forwarding of at least one packet received from the first radio node to the at least one second radio node without notifying the first radio node.

2. The radio node of claim 1, wherein the spectrum sensor comprises an artificial neural network.

3. The radio node of claim 1, wherein the spectrum sensor comprises a genetic algorithm.

4. The radio node of claim 1, further comprising:
a policy engine.

5. The radio node of claim 1, further comprising:
a policy database.

6. The radio node of claim 1, further comprising:
an RF eavesdropper subsystem coupled to the spectrum sensor.

7. A radio network comprising:
a plurality of radio nodes, at least some of the plurality of radio nodes including a non-cooperation discriminator, the non-cooperation discriminator exchanging information with a physical layer device (PHY) layer and a media access control (MAC) layer of the radio node, at least some of the plurality of radio nodes including a spectrum sensor configured to detect at least one of a potential spectrum policy violation, an accidental violation, a malicious violation, and a jamming; and a plurality of reconfigurable connections between the radio nodes, whereas at least some of the radio nodes are configured with a combination of hardware and software to carry out cognitive non-cooperation in order to detect spectrum policy violations, wherein at least some of the radio nodes include a cognitive denial of service detection and identification engine, wherein at least some of the radio nodes include a cognitive collision detection and identification engine, the cognitive collision detection and identification engine configured to create a radio profile of radios, the radio profile including an RF fingerprint, received power level, trust level, associated behavior, associated strategy, Doppler variation, variation in received power level, directional movement and local positioning with respect to a particular radio node and store the radio profile in a database, the radio profile is correlated with MAC addresses used, internet protocol (IP) addresses used, interference timing and collision rate to determine if a particular radio profile is at least one of a malicious violator, a non-malicious violator, a nonviolator, and trusted;

the non-cooperation discriminator configured to:

adjust at least one of a first trust level of a radio profile associated with a first radio node and at least one second trust level of a radio profile associated with a second radio node in response to information received from at least one of the cognitive collision detection and identification engine, the cognitive denial of service detection and identification engine, and a sending radio node; and when the first trust level reaches a trust threshold or the first radio node is determined to be a malicious violator, execute a countermeasure other than jamming or attacking the first radio node, the countermeasure including at least one of (1) report to the at least one second radio node at least one of the first trust level and a strategy having a third trust level no higher than the second trust level, and (2) block the forwarding of at least one packet received from the first radio node to the at least one second radio node without notifying the first radio node.

8. The radio network of claim 7, wherein at least some of the radio nodes include a policy engine.

9. The radio network of claim 7, wherein at least some of the radio nodes include a policy database.

10. The radio node of claim 1, wherein the strategy includes at least one of a detection strategy and a tracking strategy.

11. The radio node of claim 1, wherein the information received from a sending radio node includes at least one of a trust level associated with the first radio node and a strategy having a trust level no higher than the trust level of the radio node.

12. The radio network of claim 7, wherein the strategy includes at least one of a detection strategy and a tracking strategy.

13. The radio network of claim 7, wherein the information received from a sending radio node includes at least one of a trust level associated with the first radio node and a strategy having a trust level no higher than the trust level of the radio node associated with the non-cooperation discriminator.

* * * * *